(12) United States Patent
Kume et al.

(10) Patent No.: US 6,482,291 B1
(45) Date of Patent: Nov. 19, 2002

(54) ULTRASONIC SEALING APPARATUS

(75) Inventors: Satoshi Kume, Tokushima-ken (JP);
Takeshi Iseki, Tokushima-ken (JP);
Michio Ueda, Tokushima-ken (JP)

(73) Assignee: Shikoku Kakoki Co., Ltd., Itano-gun (JP)

(*) Notice: Subject to any disclaimer, the term of this patent is extended or adjusted under 35 U.S.C. 154(b) by 120 days.

(21) Appl. No.: 09/783,953

(22) Filed: Feb. 16, 2001

(30) Foreign Application Priority Data

Feb. 23, 2000 (JP) ........................................ 2000-046103

(51) Int. Cl.[7] .............................................. B32B 31/00
(52) U.S. Cl. .................... 156/580.2; 156/73.1; 156/553; 156/580.1
(58) Field of Search ............................ 156/73.1, 292, 156/308.2, 308.4, 553, 580.1, 580.2; 493/189, 203, 209, 239

(56) References Cited

U.S. PATENT DOCUMENTS 4,534,818 A * 8/1985 Kreager et al. ............. 156/466
6,379,483 B1 * 4/2002 Eriksson ...................... 156/73.1

FOREIGN PATENT DOCUMENTS

| JP | 56-92046 | 7/1981 |
| JP | 62-22784 | 5/1987 |
| JP | 6-15741 | 1/1994 |
| JP | 7-2231 | 1/1995 |
| JP | 7-33121 | 2/1995 |
| JP | 2544450 | 7/1996 |
| WO | WO99/48759 | 3/1999 |

* cited by examiner

Primary Examiner—James Sells
(74) Attorney, Agent, or Firm—Armstrong, Westerman & Hattori, LLP

(57) ABSTRACT

An ultrasonic sealing apparatus is provided with an excellent sealability. The apparatus is capable of supplying sufficient output energy delivered by an ultrasonic wave-generating device to a thermoplastic resin of a packing material. A tubular packing material is evenly pressed on an appropriate timing in transverse sealing so that the thermoplastic resin is sufficiently softened/melted for an excellent sealing.

10 Claims, 7 Drawing Sheets

ULTRASONIC SEALING APPARATUS

Priority is claimed with respect to Japanese Application No. 046103/2000 filed on Feb. 23, 2000 in the Japanese Patent Office, the disclosure of the application is herein incorporated by reference.

BACKGROUND OF THE INVENTION

1. Field of the Invention

The present invention relates to an ultrasonic sealing apparatus for use in a filling/packing machine for producing liquid beverages or the like packed in paper containers. More specifically, the present invention relates to the ultrasonic sealing apparatus provided with a stopper to regulate the distance between a sealing face of a horn and an action face of an opposing jaw for improved sealability by controlling the distance between the sealing face of the horn working as a sealing jaw and the action face of an opposing jaw.

2. Description of the Related Art

Hitherto, there has been known a filling/packing machine as a whole shown in FIG. 1. This packing machine contained a packing material web for a rectangular parallelepiped packing container filled with a sterilized juice.

The filling/packing machine has a rewinder 2 supporting a laminated packing material web 1 in a rolled state. It has a sterilization device 3 for sterilizing a tabular laminated packing material web successively rewound from the rewinder. It also has a longitudinal sealing section 4 for sealing longitudinal both end portions of the sterilized laminated packing material web and thereby forming a tubular laminated packing material web. It contains a liquid supply tube 5 for filling a fluid content into the web formed into a tubular form, a transverse sealing device 7 for transversely sealing the tubular laminated packing material web in the direction perpendicular to the longitudinal direction thereof in liquid, while feeding downward a tube filled with content by the length substantially corresponding to one package. Also, and at the same time, it continuously forms pillow-shaped containers 6 that are rectangular in section, and a container shaping device for forming the pillow-shaped containers 6 into rectangular parallelepiped containers 8, their final form, by folding their end portions. A sealing tape 9 is often used in forming a laminated packing material web into a tubular form. The transverse sealing device 7 is composed of a sealing jaw with a heat source, an opposing jaw for heat sealing in cooperation with the sealing jaw, and driving means to drive these sealing jaws and the opposing jaw.

Further, as an ultrasonic sealing apparatus, there is the ultrasonic sealing apparatus which comprises a piezoelectric driving unit with a piezoelectric ceramic plate or a magnetostriction driving unit, which is connected to an AC supply source, and a horn with an elongated sealing surface, and which is further characterized with one or more reaction bodies forming a half wavelength together with the horn (Japanese Laid-Open Patent Application No. 2231/1995). In addition other ultrasonic sealing apparatuses are known (Japanese Patent Publication No. 22784/1987, Japanese Patent Publication No. 2544450/1996, Japanese Laid-Open Patent Application No. 33121/1995, Japanese Laid-Open Patent Application No. 92046/1981, Japanese Laid-Open Patent Application No. 15741/1994, and the like).

Pressing on an appropriate timing (applying pressure) is required for an ultrasonic sealing apparatus aiming at high-speed filling/packing operation. There arises a problem, however, that when a tubular packing material is pressed on an appropriate timing at transverse sealing, sealing pressure reaches at the required level when softening/melting condition of a thermoplastic resin of the packing material is still insufficient, therefore, an excellent sealing formation is prevented.

SUMMARY OF THE INVENTION

An object of the present invention is to provide an ultrasonic sealing apparatus capable of supplying sufficient output energy, delivered by an ultrasonic wave-generating device, to a thermoplastic resin of a packing material even when a tubular packing material is pressed on an appropriate timing at transverse sealing, so that softening/melting of the thermoplastic resin of the packing material is sufficient enough to provide an excellent sealing.

As a cause for insufficient softening/melting of a thermoplastic resin of a packing material as described above, a lower level of output energy delivered by an ultrasonic wave-generating device to a packing material than the required set point was first considered. Therefore, output power level delivered by an ultrasonic wave-generating device at pressing was measured in time course using a voltage recording device (Omnilight, Nippondenkisanei Co. Ltd.). As shown in FIG. 2, the output power level shows an extensive rightward increase in the diagram in the course of time. This rightward-up diagram suggests by its broken line in FIG. 2 that the output power level could go beyond the maximum output power allowance (output power 100%) of an ultrasonic wave-generating device when trying to supply sufficient energy for sealing The following is considered to be a possible cause of this phenomenon. When the ultrasonic wave is delivered to a packing material under a pressed condition, the inmost thermoplastic resin layer of the packing material softens, consequently the sealing face of the horn and the action face of the opposing jaw rapidly comes closer to each other, especially when the pressing is done on an appropriate timing, and then rapidly changes into a vibrating system including the opposing jaw. When the output power level is higher than the maximum output power allowance of the ultrasonic wave-generating device (output power 100%), the protecting circuit starts to work and the ultrasonic wave delivery comes to a halt, meaning that only the energy corresponding to the dimension of the shadowed portion in FIG. 2 is delivered to the packing material.

The study lead to the conclusion that the structure as such that the sealing face of the horn and the action face of the opposing jaw do not come closer to each other more than a certain distance even when being pressed on an appropriate timing by regulating the distance between a sealing face of a horn having an elongated and flat sealing face and an action face of an opposing jaw including a pressing portion for pressing a packing material in cooperation with the sealing face of the horn, makes it possible to deliver energy corresponding to the dimension encircled by the line in FIG. 2 to the packing material. By this an excellent ultrasonic heat sealing can be achieved. Here, the invention is completed based on the above study.

The present invention, therefore, relates to an ultrasonic sealing apparatus in which a packing material consists of a laminated body containing at least a thermoplastic resin layer is formed into a tubular form. The tubular laminated packing material is transversely ultrasonically sealed, comprising a horn having an elongated and flat sealing face, an opposing jaw provided with an action face including a pressing portion for pressing a packing material in cooperation with the sealing face of the horn. The present invention also contains a stopper which regulates the distance between the sealing face of the horn and an action face of the opposing jaw. An ultrasonic sealing apparatus according to the invention is characterized in that it comprises a stopper regulating the distance between the sealing face of the horn and the action face of the opposing jaw to be smaller than that of when the tubular packing material is pressed under the non-molten condition by the horn and the opposing jaw. The stopper must be larger than that of when pressed under the molten condition. The invention also includes: an ultrasonic sealing apparatus, wherein the distance between the sealing face of the horn and the action face of the opposing jaw is smaller than that of when. the tubular packing material is pressed under the non-molten condition by 0.1–0.8 mm; an ultrasonic sealing apparatus, wherein the stopper is fixed to supporting members of the ultrasonic wave-generating device; an ultrasonic sealing apparatus, wherein the action face of the stopper is capable of butting against the action face of the opposing jaw through the tubular packing material which is pressed under the non-molten condition; an ultrasonic sealing apparatus, wherein the stopper is fixed to the opposing jaw; an ultrasonic sealing apparatus, wherein the action face of the stopper directly butts against the action face of stopper receiving members that are fixed to supporting members of the ultrasonic wave-generating device; an ultrasonic sealing apparatus, wherein a laminated body includes paper layer; an ultrasonic sealing apparatus, wherein the opposing jaw is provided with a cutting device; and an ultrasonic sealing apparatus, characterized in that when the tubular packing material is formed into a tubular form, the tubular packing material is formed into the tubular form by using a sealing tape.

DETAILED DESCRIPTION OF THE INVENTION

As a packing material consisting of a laminated body comprising at least a thermoplastic resin layer of the present invention, any laminated body comprising an inmost thermoplastic resin layer such as a polyethylene layer capable of heat sealing by means of ultrasonic heating can be used, somehow a paper sheet and the like having a paper layer for maintaining a rigidity of a container is preferable. Further, a laminated body comprising an aluminum foil layer or a synthetic resin film layer for preventing air, microbes or the like from permeating into the container, may be used. Still further, as a tubular packing material of the present invention, a packing material wherein the above packing material is formed into a tubular form by using a sealing tape may be used other than the tubular packing material wherein the above packing material is formed into a tubular form.

As an ultrasonic sealing apparatus of the present invention in which a tubular packing material is transversely ultrasonic sealed, any ultrasonic sealing apparatus will suffice so long as it comprises a horn having an elongated and flat sealing face, an opposing jaw having an action face including a pressing portion pressing a packing material in cooperation with the sealing face of the horn, and a stopper regulating the distance between the sealing face of the horn and the action face of the opposing jaw. The above mentioned ultrasonic sealing apparatus of the present invention can be used advantageously for heat sealing in fluid or outside fluid. Also, conventionally known ultrasonic wave-generating devices or ultrasonic sealing apparatuses, besides a stopper regulating the distance between the sealing face of the horn and the action face of the opposing jaw, may be used. An ultrasonic sealing apparatus provided with an ultrasonic wave-generating device as shown in FIG. 3 or in FIG. 4 which the inventors of the present invention have developed also may be used.

Figure 1:
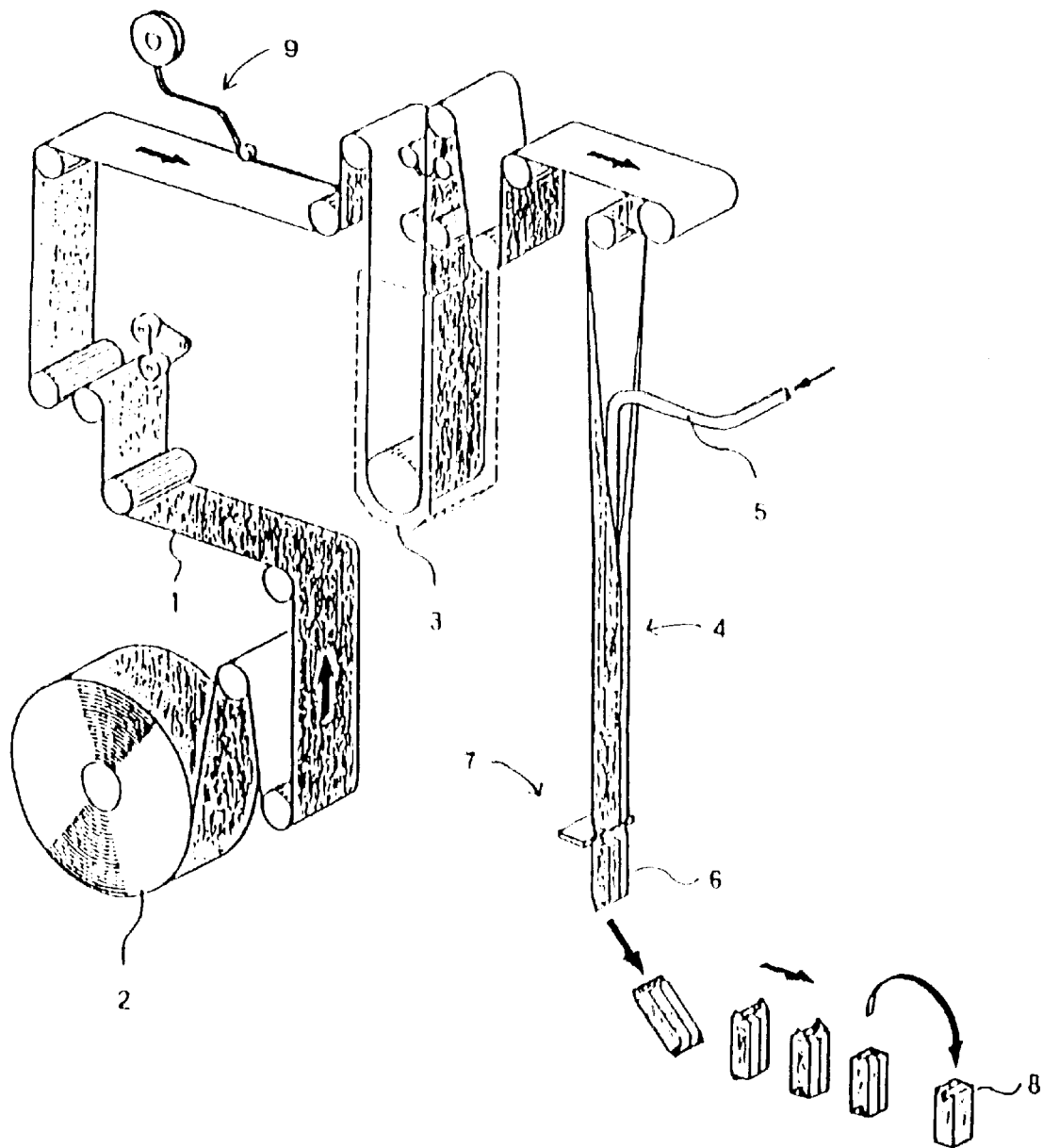
FIG. 1 is a view explaining a process until a paper packing container is formed by a conventional filling/packing machine.
Figure 2:
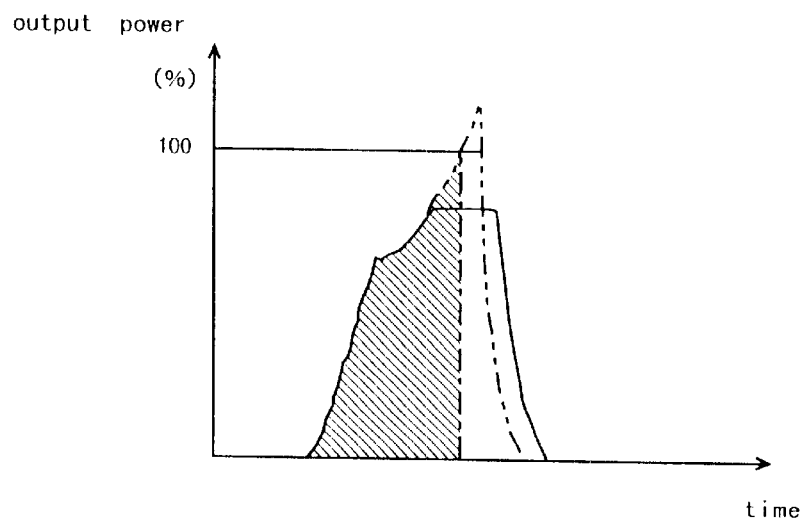
FIG. 2 is a diagram showing the output waveform of the ultrasonic wave-generating device.
Figure 3:
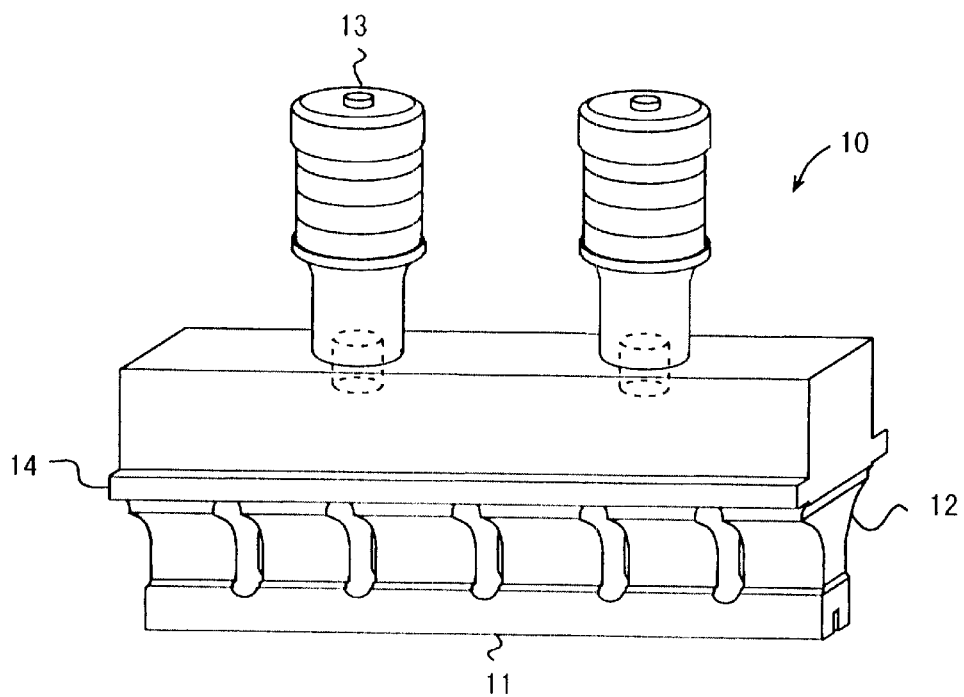
FIG. 3 is a schematic perspective view of an ultrasonic wave-generating device which can be used in an ultrasonic sealing apparatus of the present invention.
Figure 4:
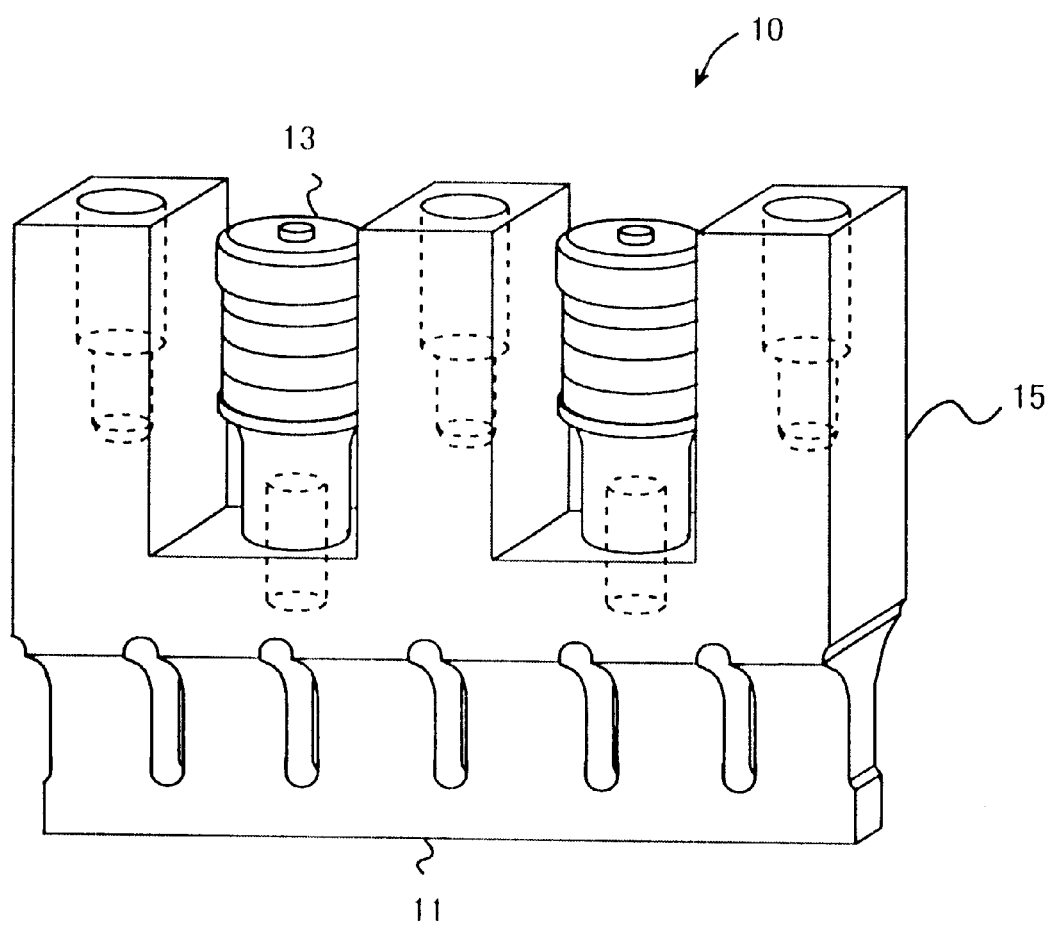
FIG. 4 is a schematic perspective view of an ultrasonic wave-generating device of another mode which can be used in an ultrasonic sealing apparatus of the present invention.

The ultrasonic wave-generating device 10 shown in FIG. 3 as mentioned above, comprises one horn 12 having two elongated and flat sealing faces 11 for sealing a packing material in the longitudinal direction, a plurality of converters 13 resonating the horn and provided standing on the opposite side of the sealing face of the horn 12, and whose length is one wavelength, and whose fixing position (attaching flange) 14 is a nodal plane. Further, the ultrasonic wave-generating device 10 as shown in FIG. 4, comprises a plurality of converters 13 provided standing on one horn-fixture uninterruptedly formed body 15 having an elongated and flat sealing face 11 for sealing the packing material in the longitudinal direction (see WO99/48759). By using an ultrasonic sealing apparatus provided with ultrasonic wave-generating device 10 with a plurality of converters 13, uniform heat sealing over the entire winder elongated sealing face including both end portions becomes possible.

As a preferable mode for an ultrasonic sealing apparatus of the present invention characterized in having a stopper regulating the distance between the sealing face of the horn and the action face of the opposing jaw, the ultrasonic sealing apparatus is exemplified having the stopper which can regulate the distance between the sealing face of the horn and the action face of the opposing jaw to be smaller than that of when pressing the packing material, by the horn as a sealing jaw and the opposing jaw, under the non-molten condition and to be larger than that of when pressed under the molten condition. For instance, an ultrasonic sealing apparatus is exemplified having a stopper regulating the distance between the sealing face of the horn and the action face of the opposing jaw to be smaller than that of when pressing under the non-molten condition by 0.1–0.8 mm, preferably 0.1–0.3 mm, and most preferably about 0.2 mm.

Further, the stopper may be structured as such either to be fixed to the supporting members of the ultrasonic wave-generating device or to be fixed to the opposing jaw. In case of a stopper fixed to the supporting members of the ultrasonic wave-generating device, it is desirable that said stopper will not influence ultrasonic generation and its action face is generally structured as a flat face parallel to both the sealing face of the horn and the action face of the opposing jaw. The action face of the stopper is structured to be back from the sealing face of the horn by 0.1–0.8 mm, preferably 0.1–0.3 mm, and most preferably about 0.2 mm. The action face of the stopper, when pressing the tubular packing material, is capable of regulating the distance between the sealing face of the horn and the action face of the opposing jaw to be smaller than that of when, for example, pressing under the non-molten condition by 0.1–0.8 mm, preferably 0.1–0.3 mm, and most preferably about 0.2 mm by butting against the action face of the opposing jaw through the non-molten packing material. In case of a stopper fixed to the opposing jaw, the distance between the sealing face of the horn and the action face of the opposing jaw can be regulated to be smaller than that of when, for example, pressing under the non-molten condition by 0.1–0.8 mm, preferably 0.1–0.3 mm, and most preferably about 0.2 mm generally by directly butting the action face of the stopper against the action face of the stopper receiving members fixed to the supporting members of the ultrasonic wave-generating device.

When the tubular packing material is transversely sealed with the ultrasonic sealing apparatus of the present invention, pressure and heat caused by mechanical vibration are charged at the inmost thermoplastic resin layer of the packing material by the elongated and flat sealing face provided at the edge portions of the horn and the pressing portion which press the packing material in cooperation with the sealing face of the horn situated on the action face of the opposing jaw. Therefore the heat sealing is accomplished and the sealing zones are formed. The sealing zones are generally concordant with the pressing portion, thus, the vicinal area on the side in contact with a fluid and the vicinal area of the cutting side where the packing containers are to be cut off, are formed on the both outer sides of the sealing zones. Then the sealing zones are formed continuously by using the ultrasonic sealing apparatus of the present invention. That is, in the ultrasonic sealing apparatus of this kind, generally two pairs of pressing members, each comprising a sealing jaw and an opposing jaw, are used and two sealing zones are formed continuously by being heat sealed by means of the respective pair of pressing members. It is adapted such that packing containers each formed into pillow-shapes are separated by being cut between the two sealed zones using a cutting means provided on the opposing jaw.

As the opposing jaw of the ultrasonic sealing apparatus of the present invention, the one is preferable which comprises, on its action face, V-shaped, or the like, grooves (grooves provided on the unpressing portion adjacent to the fluid side of the pressing portion of the action face and provided along the longitudinal direction of the pressing portion), which can form the molten thermoplastic resin bulges in the vicinal area of the fluid side of the sealing zones. By said grooves provided on the action face of the opposing jaw, the molten thermoplastic resin bulges in the vicinal area of the fluid side of the sealing zones are formed. Further, in addition to the groove on the unpressing face portion of the fluid side, grooves which can form the molten thermoplastic resin bulges in the vicinal area of the cutting side of the sealing zones may be provided on the action face of the opposing jaw. Still further, an incline may be disposed on the action face of the opposing jaw in the vicinal area of the cutting side of the sealing zones so that the molten thermoplastic resin flows out toward the direction farther from the sealing zones.

If grooves are disposed on the action face of the opposing jaw, which can form the molten thermoplastic resin bulges in the vicinal area of the fluid side or the vicinal area of the cutting side of the sealing zones, not only the excellent heat sealing is given without any contaminants in the sealing zones due to the fact that the thermoplastic resin in the sealing zones, which was melted by pressure and heat, flows from inside of the sealing zones to its outside when ultrasonically heat sealed, but also the undesirable formation of the undulated molten resin beads can be prevented, due to the molten thermoplastic resin flown out of the sealing zones of the fluid side, forming the molten thermoplastic resin bulges with constant width and thickness in the vicinal area of the fluid side of the sealing zones. Further, cutting becomes easy because the molten thermoplastic resin flown out of the sealing zones of the cutting side forms the molten thermoplastic resin bulges with constant width and thickness in the vicinal area of the cutting side of the sealing zones, and does not flow out to the cutting portion. Further, it is also possible to dispose the continuous or discontinuous ridges on the pressing portions corresponding to the sealing zone on the action face of the opposing jaw of the ultrasonic sealing apparatus of the present invention. The discontinuous ridges are disposed around the longitudinal sealing portions or on the both exterior portions where the packing material is bent over, both of which cause the steps and make the sealing pressure to be uneven, thereby preventing the sealing failure caused by tunnels from occurring.

Further, as aforementioned, in an ultrasonic sealing apparatus, packing materials, formed into the pillow-shape between two sealing zones formed by heat sealing with a pair of pressing members consisting of a sealing jaw comprising a horn and an opposing jaw, are being cut apart, a cutting device composed of a cutting edge and its driving means is commonly disposed to the opposing jaw of the ultrasonic sealing apparatus of the present invention. Cutting by this cutting device, as mentioned above, is normally done between the two sealing zones, however, the cutting device may also be disposed below the ultrasonic sealing apparatus so that the cutting approximately at the center of the broad sealing zones is possible.

Figure 5:
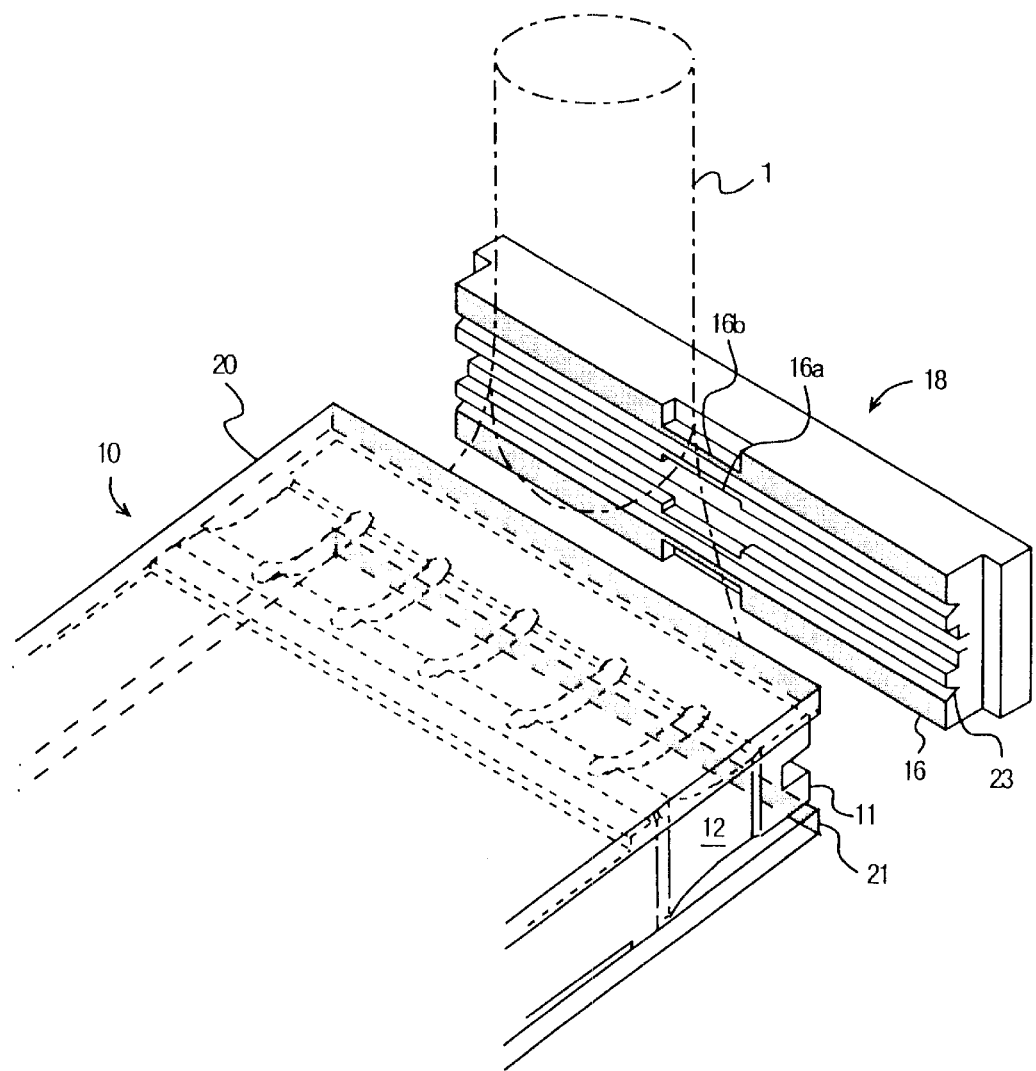
FIG. 5 is a schematic perspective view of the ultrasonic sealing apparatus of the present invention having a stopper fixed to supporting members of the ultrasonic wave-generating device.
Figure 6:
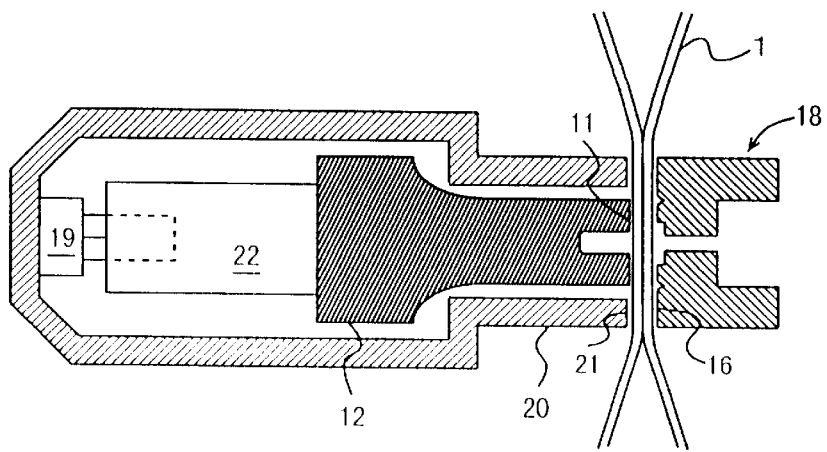
FIG. 6 is a schematic longitudinal section of an ultrasonic sealing apparatus shown in FIG. 5.
Figure 7:
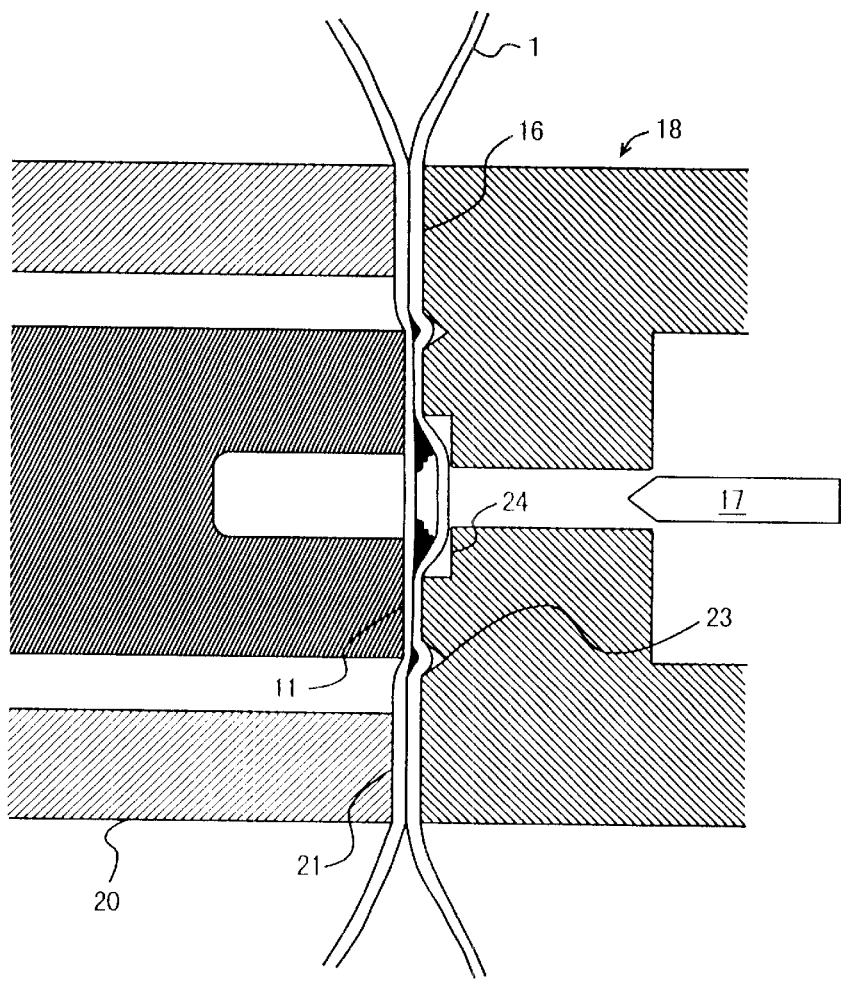
FIG. 7 is a partial macrograph of the schematic longitudinal section of an ultrasonic sealing apparatus shown in FIG. 5.
Figure 8:
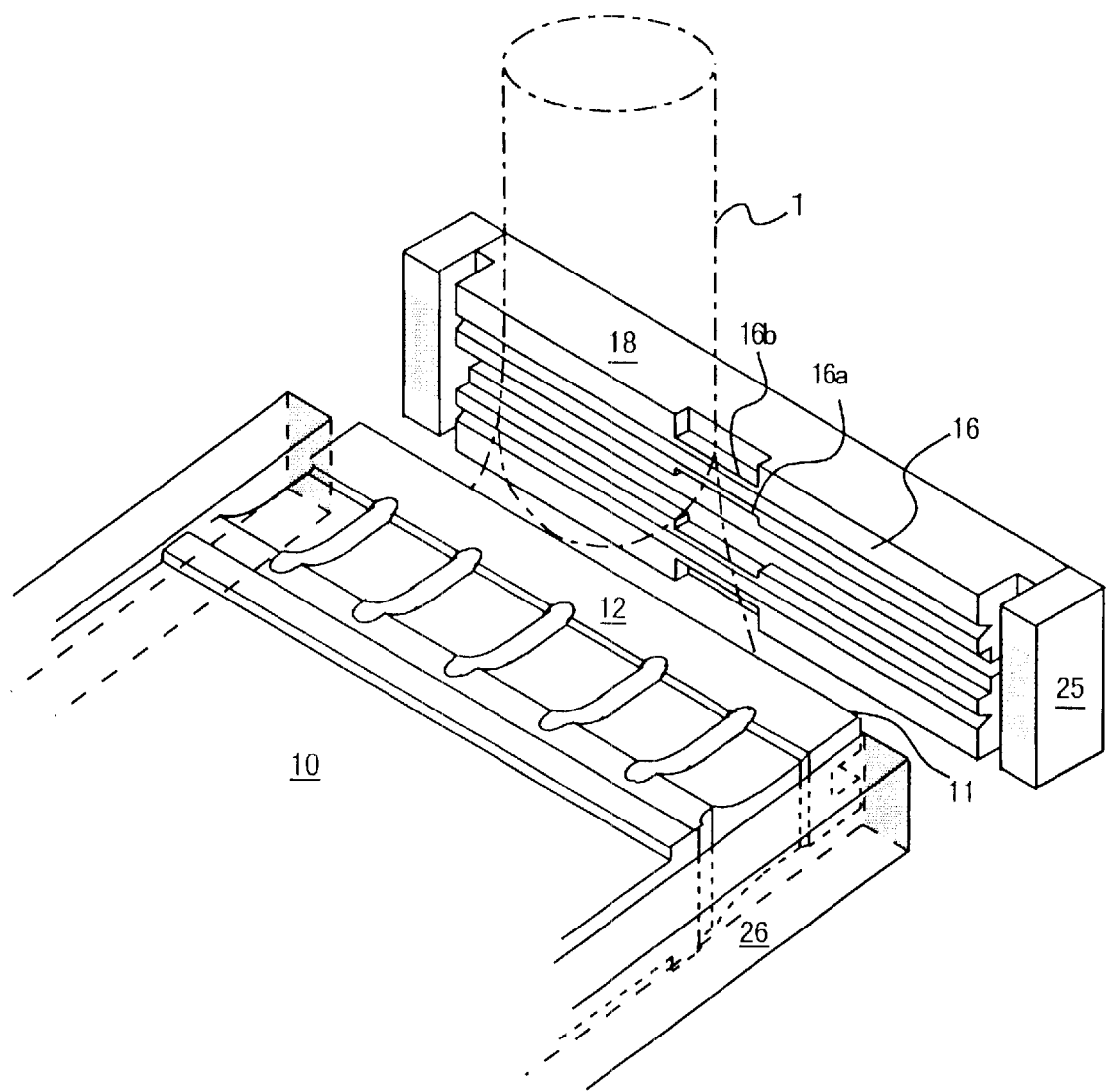
FIG. 8 is a schematic perspective view of the ultrasonic sealing apparatus of the present invention comprising a stopper fixed to the opposing jaw.
Figure 9:
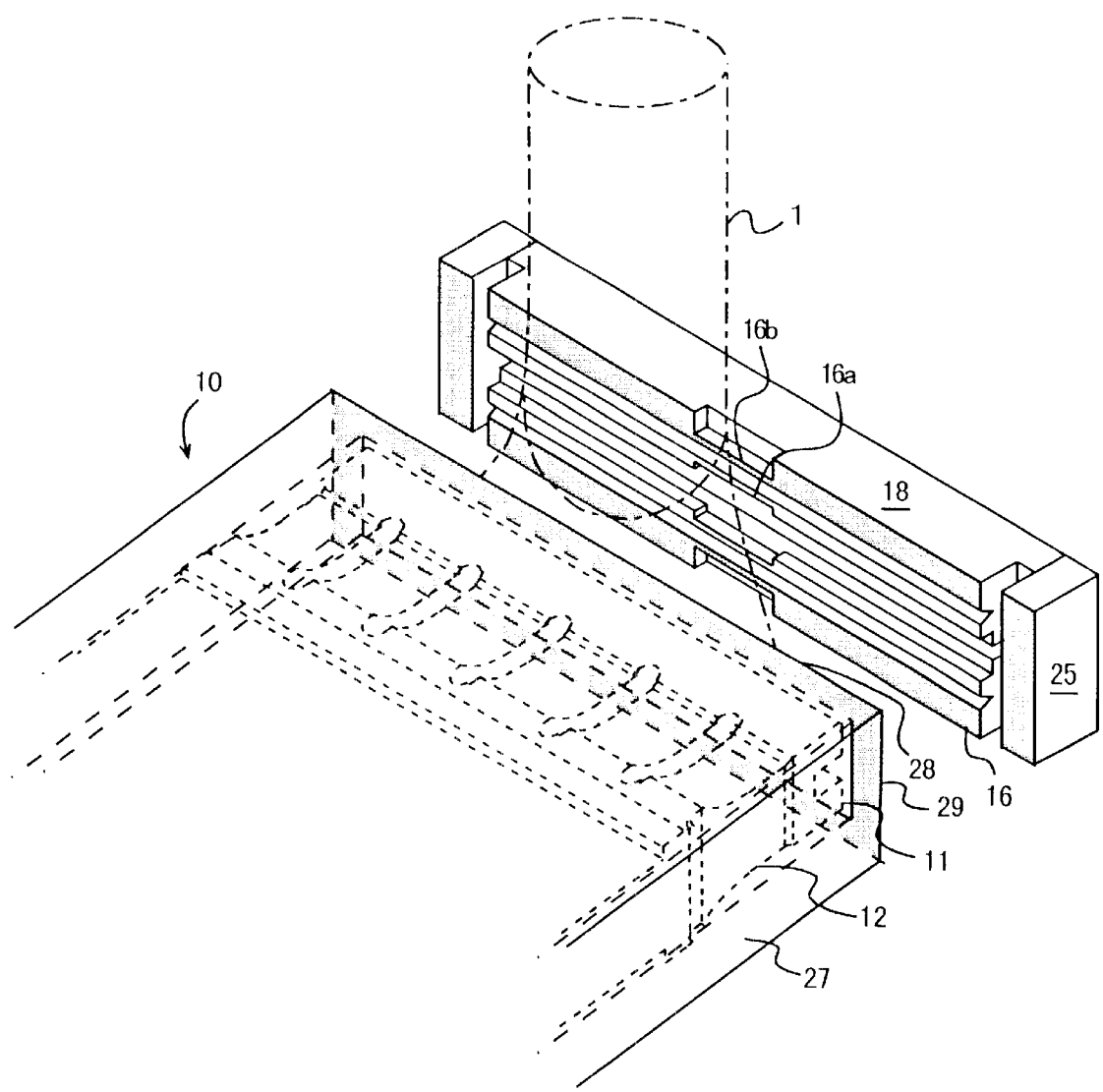
FIG. 9 is a schematic perspective view of the ultrasonic sealing apparatus of the present invention comprising both a stopper fixed to the opposing jaw and a stopper fixed to the supporting members of the ultrasonic wave-generating device.

The embodiments of the ultrasonic sealing apparatus of the present invention will be described hereunder with reference to FIGS. 5 to 9, but the technical scope of the present invention is not limited to those embodiments. FIG. 5 is a schematic perspective view of the ultrasonic sealing apparatus of the present invention having a stopper fixed to the supporting members of the ultrasonic wave-generating device. FIG. 6 is a schematic view in longitudinal section of the ultrasonic sealing apparatus as shown in FIG. 5. FIG. 7 is a partial macrograph of the schematic view in longitudinal section of the ultrasonic sealing apparatus as shown in FIG. 5. FIG. 8 is a schematic perspective view of the ultrasonic sealing apparatus of the present invention having a stopper fixed to the opposing jaw. FIG. 9 is a schematic perspective view of the ultrasonic sealing apparatus of the present invention having both the stopper fixed to the supporting members of the ultrasonic wave-generating device and the stopper fixed to the opposing jaw.

The ultrasonic sealing apparatus as shown in FIGS. 5 to 7 comprises a horn 12 having two elongated and flat sealing faces 11, an opposing jaw 18 having an elongated action face 16 including the pressing portion for pressing a tubular packing material 1 in cooperation with the sealing face 11 of the horn and a cutting device 17, and a stopper 20 fixed to the supporting member 19 of the ultrasonic wave-generating device 10, disposed as to sandwich vertically, in spaced parallel, said horn in between. As mentioned, the stopper 20 is provided in spaced relation to the horn 12, so that it will not influence the ultrasonic wave generation. Further, as shown in FIGS. 6 and 7, the action face 21 of the stopper is structured to be back from the sealing face of the horn by about 0.2 mm, thus when a tubular packing material is being pressed (FIG. 7), the action face 21 of the stopper is capable of regulating the distance between the sealing face 11 of the horn and the action face 16 of the opposing jaw to be smaller than that of when pressing under the non-molten condition by about 0.2 mm by butting against the action face 16 of the opposing jaw through the packing material under the non-molten condition. Also as shown in FIG. 6, 22 represents a fixture.

As it is obvious from FIGS. 5–7, a V-shaped groove 23 which can form the molten thermoplastic resin bulges in the vicinal area of the side of the sealing zones in contact with a fluid, and a groove 24 which can form the molten thermoplastic resin bulges in the vicinal area of the cutting side of the sealing zones, are provided on the action face 16 of the opposing jaw 18 of the ultrasonic sealing apparatus. Further, as shown in FIG. 5, the width of the action face 16a of the pressing portion corresponding to the center portion of the longitudinal direction of the sealing zone is formed, narrower, to be about ⅓ of the width of the other portions. By forming narrowly as mentioned, a greater pressure can be applied to a packing material with thickness of three-ply portions including the longitudinal sealing portion, than to the other two-ply portions. Further, a notch is disposed on the action face 16b of the opposing jaw butting against the longitudinal center portion of the action face 21 of the stopper through a packing material under non-molten condition, so that the distance between the sealing face of the horn and the action face of the opposing jaw regulated by the stopper is not to be influenced by the packing material with three-ply portions.

The ultrasonic sealing apparatus as shown in FIG. 8 comprises a horn 12 having two elongated and flat sealing faces 11, an elongated action face 16 comprising a pressing portion for pressing a tubular packing material 1 in cooperation with the sealing face 11 of the horn, and an opposing jaw 18 having a cutting device, a stopper 25 fixed to both side faces of the opposing jaw 18 and disposed outward from both outer side faces of the horn, and stopper receiving members 26 fixed to supporting members (not illustrated) of the ultrasonic wave-generating device 10. A flat action face of the stopper 25 and a flat action face of the stopper receiving members 26 are formed to directly butt against each other when pressing, so that the sealing face 11 of the horn 12 will not go too close to the action face 11 of the opposing jaw 18.

The ultrasonic sealing apparatus of the present invention shown in FIG. 9 comprises the horn 12 having two elongated and flat sealing faces 11, the elongated action face 16 including the pressing portion for pressing the tubular packing material 1 in cooperation with the sealing face 11 of the horn, an opposing jaw having a cutting device, a skirt stopper 27 fixed to the supporting members of the ultrasonic wave-generating device 10, disposed as to be in spaced parallel relations to the horn surrounding from four directions, from lateral and vertical directions, and the stopper 25 fixed to both side faces of the opposing jaw 18 and disposed outward adjacent to both outer side faces of the horn.; Since this skirt stopper 27 is also disposed to be in spaced relation to the horn 12, it will not influence the ultrasonic wave generation. The action face of the skirt stopper 27 has a one-face structure and is positioned to be back from the sealing face of the horn by about 0.2 mm, its vertical action face 28 works as a stopper, and the action face on both lateral outer sides 29 work as stopper receiving members of the stopper 25 fixed to the opposing jaw 18. Further, the action face of the stopper 25 is protruded from the action face of the opposing jaw by the thickness of a tubular packing material which is pressed under non-molten condition. When a tubular packing material is pressed by means of said ultrasonic sealing apparatus, the vertical action face 28 of the skirt stopper 27 butts against the action face 16 of the opposing jaw through a packing material under non-molten condition, at the same time the action face of the stopper 25 and the action face 29 of both lateral outer sides of the skirt stopper 27 directly butt against each other, resulting in regulating the distance between the sealing face 11 of the horn and the action face 16 of the opposing jaw 18 with more certainty.

The ultrasonic sealing apparatus is exemplified comprising a stopper capable of regulating the distance between the sealing face of the horn and the action face of the opposing jaw to be smaller than that of when pressing a tubular packing material by the horn as a sealing jaw and the opposing jaw under the non-molten condition, and to be larger than that of when pressing under the molten condition, for example, regulating the distance between the sealing face of the horn and the action face of the opposing jaw to be smaller than that of when pressing under the non-molten condition by 0.1–0.8 mm, preferably 0.1–0.3 mm, and most preferably about 0.2 mm.

When the ultrasonic sealing apparatus of the present invention is used, output energy generated by the ultrasonic wave-generating device and delivered to a thermoplastic resin of a packing material is sufficient even when the tubular packing material is pressed on an appropriate timing at transverse sealing, thus softening/melting of the thermoplastic resin is sufficient enough to achieve an excellent sealing.

What is claimed is:

1. An ultrasonic sealing apparatus in which a packing material consisting of a laminated body containing at least a thermoplastic resin layer formed into a tubular form and the tubular packing material is transversely ultrasonic sealed, comprising: a horn having an elongated and flat sealing face, an opposing jaw provided with an action face including a pressing portion for pressing a packing material in cooperation with the sealing face of the horn, and a stopper which regulates the distance between the sealing face of the horn and an action face of the opposing jaw.

2. The ultrasonic sealing apparatus according to claim 1, further comprising a stopper regulating a distance between the sealing face of the horn and the action face of the opposing jaw to be smaller when a tubular packing material is pressed under a non-molten condition by the horn and the opposing jaw, and to be larger when pressed under the molten condition.

3. The ultrasonic sealing apparatus according to claim 2, wherein the distance between the sealing face of the horn and the action face of the opposing jaw is smaller by 0.1–0.8 mm than that of when the tubular packing material is pressed under the non-molten condition.

4. The ultrasonic sealing apparatus according to claim 1, wherein the stopper is fixed to supporting members of an ultrasonic wave-generating device.

5. The ultrasonic sealing apparatus according to claim 4, wherein an action face of the stopper is capable of butting against the action face of the opposing jaw through a tubular packing material which is pressed under the non-molten condition.

6. The ultrasonic sealing apparatus according to claim 1, wherein the stopper is fixed to the opposing jaw.

7. The ultrasonic sealing apparatus according to claim 6, wherein an action face of the stopper directly butts against the action face of stopper receiving members that are fixed to supporting members of an ultrasonic wave-generating device.

8. The ultrasonic sealing apparatus according to claim 1, wherein a laminated body includes a paper layer.

9. The ultrasonic sealing apparatus according to claim 1, wherein the opposing jaw is provided with a cutting device.

10. The ultrasonic sealing apparatus according to claim 1, wherein a tubular packing material is formed into the tubular form by using a sealing tape.

* * * * *